(12) United States Patent
Ariga

(10) Patent No.: US 9,008,497 B2
(45) Date of Patent: Apr. 14, 2015

(54) IMAGE PICKUP APPARATUS AND CONTROL METHOD THEREFOR

(75) Inventor: Yuichi Ariga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 293 days.

(21) Appl. No.: 13/108,579

(22) Filed: May 16, 2011

(65) Prior Publication Data

US 2011/0293257 A1 Dec. 1, 2011

(30) Foreign Application Priority Data

May 27, 2010 (JP) ................................ 2010-121688

(51) Int. Cl.
*G03B 9/70* (2006.01)
*G03B 15/02* (2006.01)
*G03B 7/00* (2014.01)
*H04N 5/235* (2006.01)
*H04N 5/222* (2006.01)
*G03B 15/04* (2006.01)
*F21K 5/16* (2006.01)
*H04N 5/225* (2006.01)

(52) U.S. Cl.
CPC .............. *H04N 5/2353* (2013.01); *G03B 15/04* (2013.01); *G03B 15/0452* (2013.01); *H04N 5/2256* (2013.01)

(58) Field of Classification Search
USPC .......................... 396/166, 167, 179, 180, 155; 348/362–364, 367, 370, 371
See application file for complete search history.

(56) References Cited

U.S. PATENT DOCUMENTS

2006/0098115 A1\* 5/2006 Toyoda .......................... 348/362
2008/0211922 A1\* 9/2008 Murashima et al. ...... 348/208.99
2010/0079644 A1\* 4/2010 Tamura ......................... 348/302

FOREIGN PATENT DOCUMENTS

| CN | 101322399 A | 12/2008 |
| JP | 11-041523 | 2/1999 |
| JP | 2001-094876 A | 4/2001 |
| JP | 2010-087664 A | 4/2010 |

OTHER PUBLICATIONS

Feb. 18, 2014 Japanese Office Action, issued in Japanese Patent Application No. 2010-121688.
Feb. 8, 2014 Chinese Office Action, issued in Chinese Patent Application No. 201110141631.1.

\* cited by examiner

*Primary Examiner* — Rochelle-Ann J Blackman
(74) *Attorney, Agent, or Firm* — Cowan, Liebowitz & Latman, P.C.

(57) ABSTRACT

An image pickup apparatus capable of generating a strobe emission signal in a proper timing even when an electronic front curtain shutter is used in strobe photographing. The image pickup apparatus includes an image pickup device having pixels arranged in matrix and configured to store charges generated according to a received amount of light. A vertical scanning circuit controls travel of the electronic front curtain shutter such that the image pickup device sequentially receives light on a per line basis, starting from a first scan line. When it is detected that the electronic front curtain shutter reaches a predetermined scan line, a NOR gate outputs a light emission timing signal, whereby light is emitted from a light emission unit such as a strobe.

31 Claims, 9 Drawing Sheets

IMAGE PICKUP APPARATUS AND CONTROL METHOD THEREFOR

BACKGROUND OF THE INVENTION

1. Field of the Invention

The present invention relates to an image pickup apparatus and a control method therefor in which a mechanical shutter and an electronic shutter are used in combination to control an amount of exposure, and more particularly, to an image pickup apparatus and a control method therefor in which strobe light emission is controlled while an image is being picked up.

2. Description of the Related Art

As an image pickup apparatus, a digital camera is known. In some digital camera of single-lens reflex type, photographing is performed while using a focal plane shutter (hereinafter, referred to as mechanical shutter) and an electronic shutter in combination (see, for example, Japanese Laid-open Patent Publication No. 11-41523).

In such a digital camera, a rear curtain of a shutter mechanism of the camera is constituted by the mechanical shutter. At the time of photographing, the electronic shutter is driven to perform scanning to accumulate charges in pixels of an image pickup device of the camera before the rear curtain is operated or traveled. Hereinafter, the electronic shutter and the mechanical shutter will be sometimes referred to as the electronic front curtain shutter and the mechanical rear curtain shutter, respectively.

The image pickup device is implemented by a CMOS sensor, for example. In that case, charge accumulation is started after pixels are reset on a per pixel basis or on a per scanning line basis, i.e., after scanning that zeros the accumulated charge amount of each pixel is performed. Then, signal reading scanning is made on a per pixel basis or on a per scanning line basis after lapse of a predetermined time period from the start of the charge accumulation, whereby an electronic shutter is realized. Hereinafter, such charge accumulation start scanning will be referred as the reset scanning.

In a digital camera having the mechanical rear curtain shutter used in combination with the electronic front curtain shutter, the image pickup device of the camera is light-shielded by the mechanical rear curtain shutter during or after the reset scanning. Then, reading scanning is performed to read charges accumulated in the pixels of the image pickup device. The reset scanning must be made in a scanning pattern matching a travel characteristic of the mechanical rear curtain shutter.

At the time of strobe photographing, the mechanical front curtain shutter is used in the digital camera of single-lens reflex type, and completion of travel of the mechanical front curtain shutter is detected by a photo reflector or by a mechanical switch. Then, a strobe emission signal is generated based on a result of the detection.

The above also applies to a case where the digital camera is set to a photographing mode in which the electronic front curtain shutter is usable. This is because the curtain shutter is not provided with a mechanical shutter mechanism, so that a strobe emission signal cannot be generated at completion of the shutter travel. Thus, even in the photographing mode in which the electronic front curtain shutter is usable, strobe photographing is not performed by using the electronic front curtain shutter, but performed by using the mechanical front curtain shutter.

As described above, with the electronic front curtain shutter whose completion of travel cannot be detected by a photo reflector or by a mechanical switch, a problem is posed that the strobe emission signal cannot be generated, so that the strobe cannot be emitted with accuracy.

SUMMARY OF THE INVENTION

The present invention provides an image pickup apparatus and a control method therefor capable of causing a light emission unit to emit light at a proper timing even when strobe photographing is performed by using an electronic front curtain shutter.

According to one aspect of this invention, there is provided an image pickup apparatus capable of performing still image photographing with light emission of a light emission unit, comprising an image pickup device configured to store charges generated according to a received amount of light, a scanning unit configured to perform scanning for sequentially starting charge accumulation in respective image pickup regions of the image pickup device from one end to another end of the image pickup device, a detection unit configured to detect that the scanning for a predetermined image pickup region of the image pickup device has been performed by the scanning unit, and a light emission control unit configured, in a case where still image photographing with light emission of the light emission unit is performed, to cause the light emission unit to start light emission when the detection unit detects that the scanning for the predetermined image pickup region has been performed.

With the present invention, it is possible to cause the light emission unit to emit light at a proper timing even when strobe photographing is performed by using the electronic front curtain shutter.

Further features of the present invention will become apparent from the following description of an exemplary embodiment with reference to the attached drawings.

BRIEF DESCRIPTION OF THE DRAWINGS

FIGS. 5A to 5C are views showing motions of the mechanical front and rear curtain shutters in a case that the mechanical front curtain shutter is used in the photographing, wherein FIG. 5A shows a state immediately after the travel of the mechanical front curtain shutter is started, FIG. 5B shows a state where both the mechanical front and rear curtain shutters are travelling, and FIG. 5C shows a state where the travel of the mechanical front curtain shutter is completed;

FIGS. 8A to 8C are views showing motions of the electronic front curtain shutter and the mechanical rear curtain shutter in a case that the electronic front curtain shutter is used in the photographing, wherein FIG. 8A shows a state immediately after the travel of the electronic front curtain shutter is started, FIG. 8B shows a state where both the electronic front curtain shutter and the mechanical rear curtain shutters are travelling, and FIG. 8C shows a state where the travel of the electronic front curtain shutter is completed;

DESCRIPTION OF THE EMBODIMENTS

The present invention will now be described in detail below with reference to the drawings showing a preferred embodiment thereof.

Figure 1:
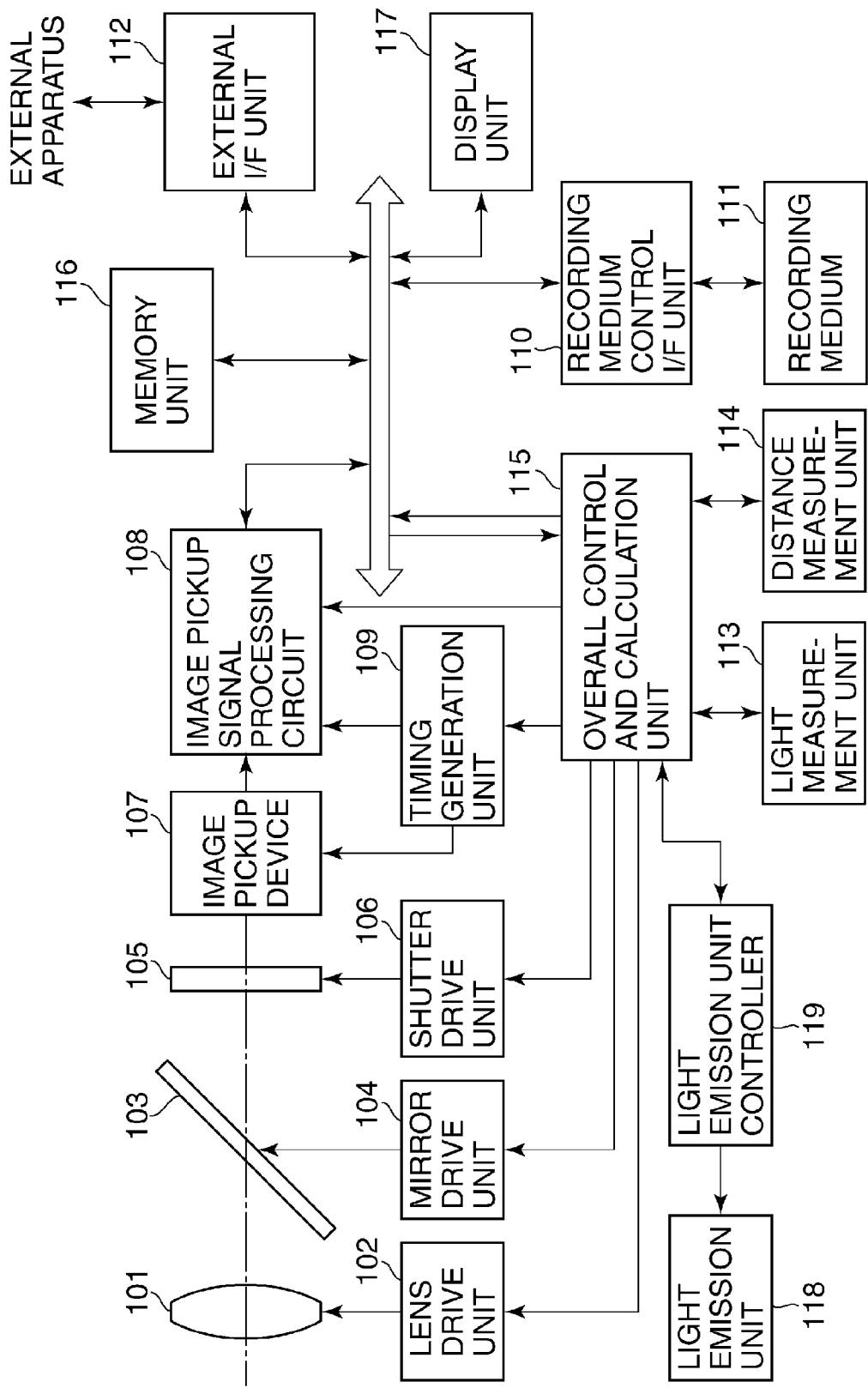
FIG. 1 is a block diagram schematically showing an example construction of a digital camera according to one embodiment of this invention.

FIG. 1 schematically shows in block diagram an example construction of a digital camera, which is an image pickup apparatus according to one embodiment of this invention.

Referring to FIG. 1, the digital camera includes an overall control and calculation unit (hereinafter, sometimes referred to as the control unit) 115 for controlling the entire digital camera. The control unit 115 is implemented by, e.g., a microcomputer. The digital camera includes a lens unit 101 that incorporates a diaphragm mechanism. An optical image of an object passing through the lens unit 101 is formed on an image pickup device 107. An image signal (hereinafter, sometimes referred to as the image pickup signal) based on the optical image is output from the image pickup device 107. The image pickup device 107 is implemented by, e.g., a CMOS sensor.

The optical image passing through the lens unit 101 is guided to a finder (not shown) by a mirror 103. At the time other than photographing, the mirror 103 is moved down to become a state shown in FIG. 1 where it can guide the optical image to the finder. At the time of photographing, the mirror 103 is flipped upward so that the optical image is guided to an image pickup device 107. After the photographing, the mirror 103 again becomes the state shown in FIG. 1.

Under the control of the overall control and calculation unit 115, the lens drive unit 102 performs focus lens control and diaphragm mechanism control for the lens unit 101, and a mirror drive unit 104 moves the mirror 103 upward and downward.

A shutter 105 is disposed between the lens unit 101 and the image pickup device 107. The shutter 105 has a mechanical curtain shutter that corresponds to a focal plane type front curtain/rear curtain used in a so-called single-lens reflex camera. With the shutter 105, an optical image passing through the lens unit 101 is light-shielded and an exposure time is adjusted. Under the control of the overall control and calculation unit (control unit) 115, a shutter drive unit 106 drives the front and rear curtains of the shutter 105 and performs, e.g., a charging operation for returning the shutter 105 to an initial position.

A distance measurement unit 114 measures a distance from the digital camera to an object, and supplies a distance measurement signal to the control unit 115. A light measurement unit 113 measures a brightness of the object, and supplies a light measurement signal to the control unit 115. At the time of still image photographing, the control unit 115 controls the lens drive unit 102 and the shutter drive unit 106 based on the measurement signals supplied from the measurement units 114, 113, thereby performing focus control and exposure amount control.

On the other hand, at the time of, e.g., so-called live view photographing and moving image photographing, the mirror 103 is in a flipped-up state, and therefore an optical image is not guided to the distance measurement unit 114 and the light measurement unit 113 in the single-lens reflex camera, so that the distance measurement and light measurement are not performed by these units 114, 113.

For this reason, at the time of live view photographing and moving image photographing, distance measurement and light measurement are performed according to an image pickup signal (image signal) output from the image pickup device 107, without using the distance measurement unit 114 and the light measurement unit 113. Based on results of the distance measurement and light measurement, the control unit 115 controls the lens drive unit 102 and the shutter drive unit 106.

The image pickup signal processing circuit 108 amplifies the image pickup signal supplied from the image pickup device 107, and performs A/D conversion for converting the image pickup signal (analog signal) into a digital signal. Further, the signal processing circuit 108 performs correction processing such as defect correction on the A/D converted image data, or performs compression processing or the like on the image data.

Under the control of the control unit 115, a timing generation unit 109 outputs a timing signal to the image pickup device 107 and the signal processing circuit 108. The timing generation unit 109 is able to transmit and receive a signal to and from the image pickup device 107 or to and from the signal processing circuit 108. Also, the control unit 115 is able to make settings of the image pickup device 107 or the signal processing circuit 108 and able to read a state of the image pickup device 107 or a state of the signal processing circuit 108.

At the time of still image photographing, the light emission unit 118 emits auxiliary light. The light emission of the unit 118 is controlled by a light emission unit controller 119. Settings of the controller 119 regarding the charging for light emission of the unit 118 and regarding an emission mode at the time of photographing are made by the control unit 115. The light emission unit controller 119 transmits information representing a state of the light emission unit 118 to the control unit 115.

Single-lens reflex cameras are classified into a type incorporating a light emission unit and a type attached with a separate light emission unit. In the illustrated example, the digital camera incorporates the light emission unit 118. Alternatively, a separate light emission unit can be attached to the digital camera.

The digital camera includes a memory unit 116 in which image data is temporarily stored and in which various adjustment value, a control program for use by the control unit 115, etc. are stored.

The digital camera includes a recording medium control interface (I/F) unit 110 to which a recording medium 111 is detachably mounted. The I/F unit 110 performs processing for recording and reading various data such as image data into and from the recording medium 111.

The recording medium 111 is implemented by a semiconductor memory or the like.

The digital camera includes an external I/F unit 112 which is used for communication with an external apparatus (not shown) such as a computer, and includes a display unit 117 on which a photographed still image, moving image, or the like is displayed.

Figure 2A:
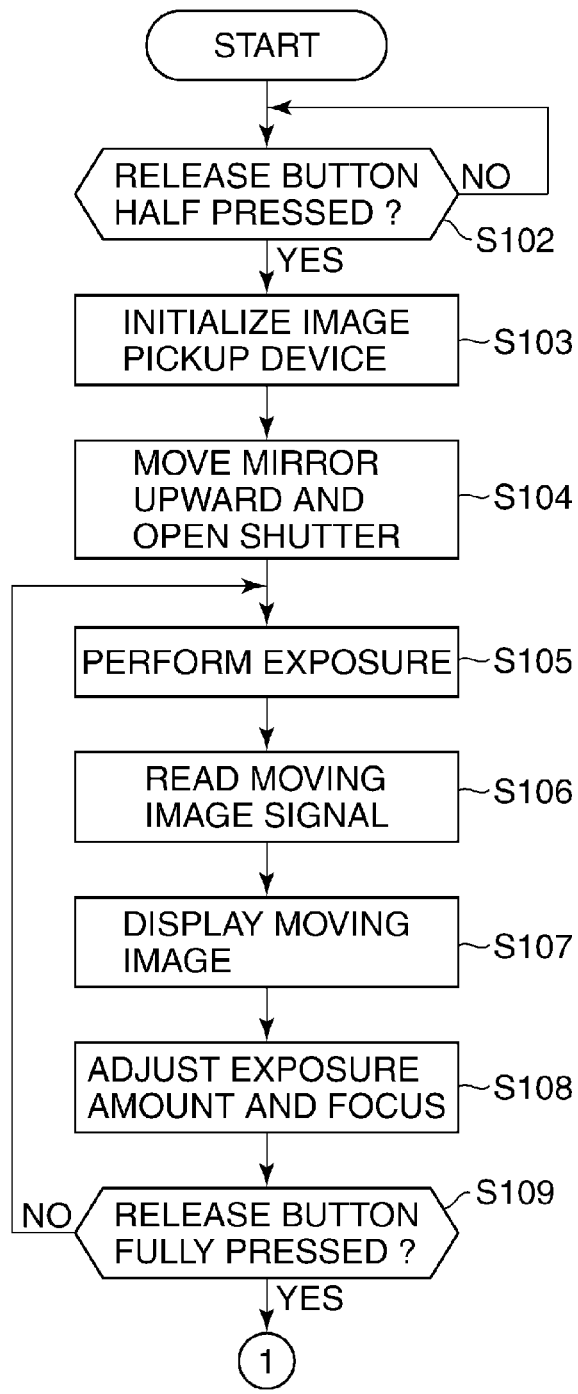
FIGS. 2A and 2B are a flowchart showing a photographing operation of the digital camera.
Figure 2B:
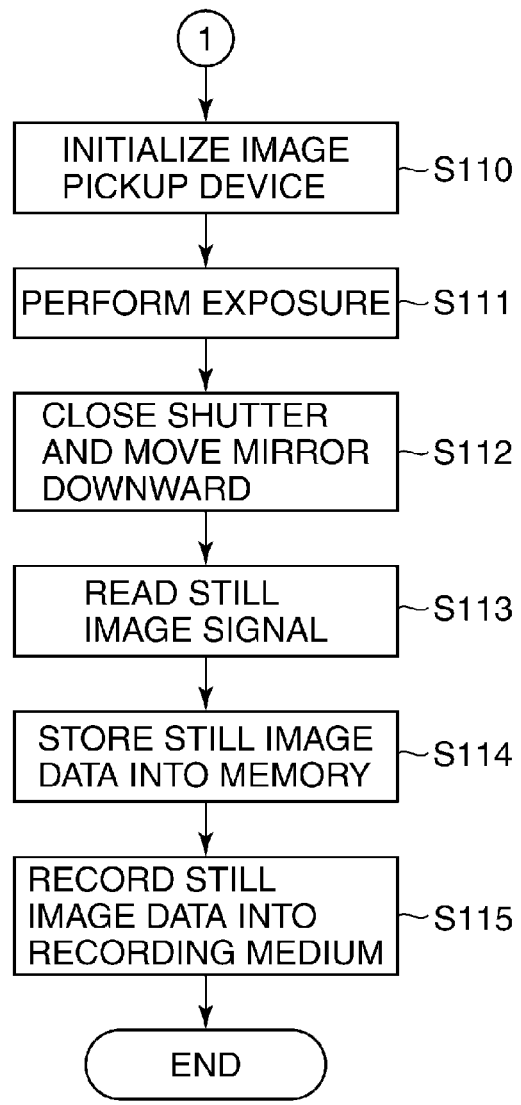

Next, a description will be given of operation of the digital camera shown in FIG. 1 at the time of photographing. FIGS. 2A and 2B show in flowchart a photographing operation of the digital camera.

When a main power unit (not shown) of the digital camera is turned on, power supply to the respective drive units and power supply to the image pickup system such as the image pickup signal processing circuit 108 are turned on, and the photographing operation is started.

The control unit 115 determines whether a release button (not shown) is half pressed (step S102). If the answer to step S102 is NO, the control unit 115 waits for the release button being half pressed.

When the release button is half pressed (i.e., if the answer to step S102 becomes YES), the control unit 115 controls the timing generation unit 109 and the signal processing circuit 108 to initialize the image pickup device 107 (step S103), whereby the image pickup device 107 becomes a state able to perform charge accumulation.

Next, the control unit 115 controls the mirror drive unit 104 to move the mirror 103 upward, and controls the shutter drive unit 106 to open the shutter 105 (step S104). The image pickup device 107 controls a charge accumulation time by means of a slit rolling electronic shutter for a rolling readout of moving images, thereby attaining exposure suited to a photographing scene (step S105).

Then, the control unit 115 controls the timing generation unit 109 and the image pickup signal processing circuit 108 to read a moving image signal from the image pickup device 107 (step S106). At that time, so-called rolling readout is performed, in which the image signal is readout in different timings between upper and lower parts of an image pickup plane of the image pickup device 107.

Next, the control unit 115 causes the image pickup signal processing circuit 108 to process the moving image signal read from the image pickup device 107. The signal processing circuit 108 creates moving image data based on the moving image signal. The control unit 115 causes the display unit 117 to display, as a moving image, the moving image data created by the signal processing circuit 108 (step S107).

The control unit 115 measures a brightness of the object based on the image signal read from the image pickup device 107, and controls the slit rolling electronic shutter according to a result of the brightness measurement to maintain a proper amount of exposure. Further, the control unit 115 measures a contrast of the object, and drives the lens unit 101 while controlling the lens drive unit 102 to always adjust the focus on the object (step S108), whereby an optical image of the object is formed on the image pickup device 107.

Next, the control unit 115 determines whether the release button is fully pressed (step S109). If the answer to step S109 is NO, the flow returns to step S105. In other words, the control unit 115 causes the display unit 117 to display the moving image, while regularly updating the image signal.

If the release button is fully pressed (if YES to step S109), the control unit 115 controls the timing generation unit 109 and the signal processing circuit 108 to initialize the image pickup device 107 for still image photographing (step S110), whereby the image pickup device 107 becomes a state capable of photographing a still image.

Based on the light measurement value measured in step S108, the control unit 115 causes the electronic or mechanical front curtain shutter to travel so as to attain a proper amount of exposure. Then, the control unit 115 performs control to cause the mechanical rear curtain shutter to travel so as to open the shutter for a predetermined time period (step S111).

In the case of exposure amount control by the mechanical front curtain shutter, the travelling of the shutter is already started prior to the exposure in step S111, and it is therefore necessary to charge the mechanical front curtain shutter to return it to its initial position and then again to cause the shutter to travel, as will be described with reference to FIG. 3.

After completion of the exposure, the control unit 115 controls the mirror drive unit 104 to move the mirror 103 downward (step S112). Next, the control unit 115 controls the timing generation unit 109 and the image pickup signal processing circuit 108 to read a still image signal from the image pickup device 107 (step S113). The control unit 115 causes the signal processing circuit 108 to process the still image signal read from the image pickup device 107, whereby still image data is created by the signal processing circuit 108.

At that time, the signal processing circuit 108 performs processing, e.g., for correction of defective pixels based on defect correction data. The still image data signal-processed and created by the signal processing circuit 108 is temporarily stored into the memory unit 116 (step S114). The control unit 115 records the still image data stored in the memory unit 116 into the recording medium 111 through the recording medium control I/F unit 110 (step S115). When the still image data has been recorded into the recording medium, the photographing operation shown in FIGS. 2A and 2B is completed and the photographing operation start state is established again.

In the following, the details of the exposure performed in step S111 of FIG. 2A will be described.

Figure 3:
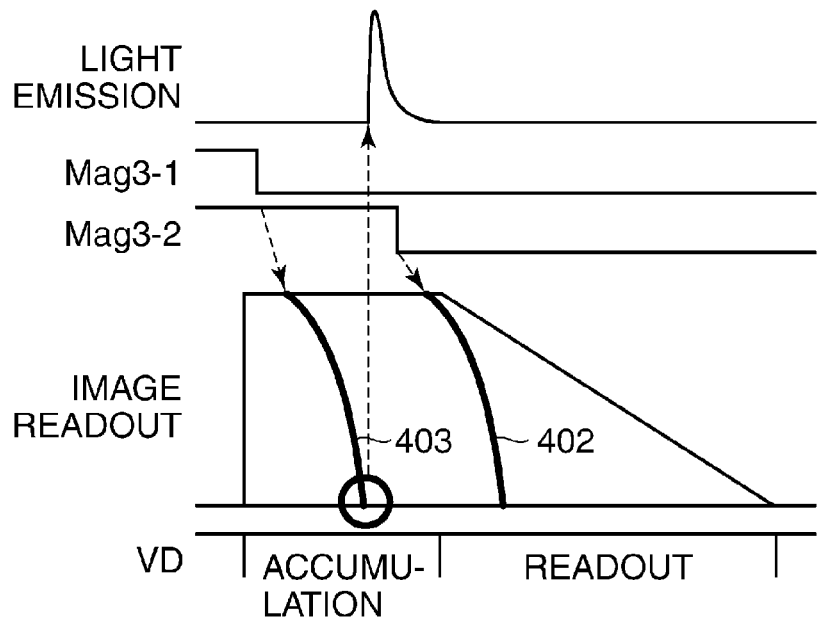
FIG. 3 is a view showing a light emission timing in a case that a mechanical front curtain shutter is used in the photographing.
Figure 4:
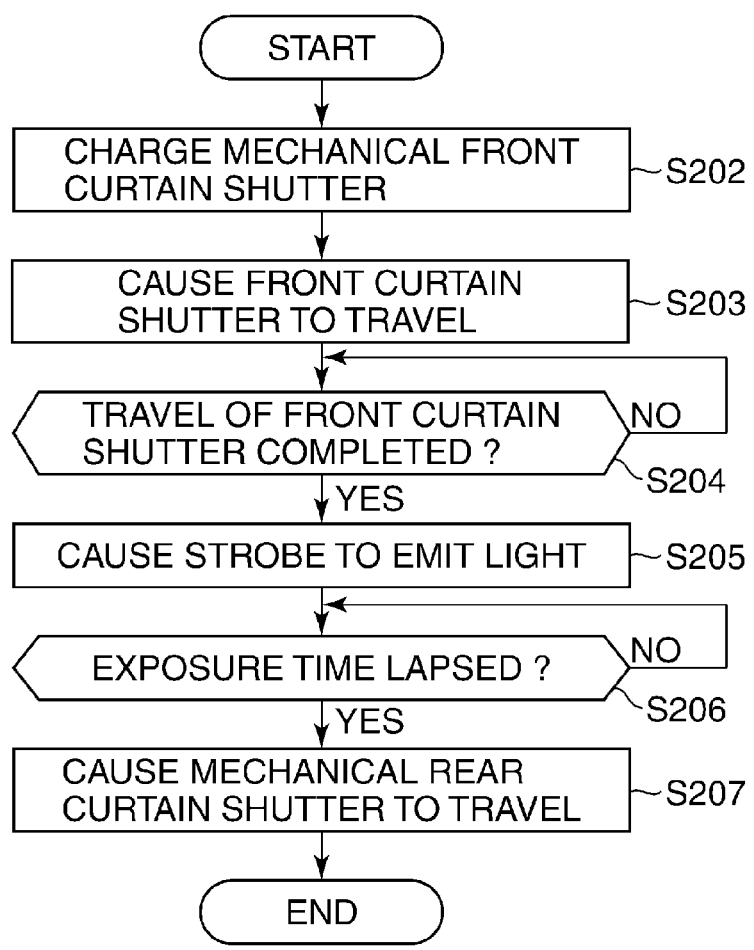
FIG. 4 is a flowchart showing the details of the exposure by the mechanical front curtain shutter in the photographing operation shown in FIGS. 2A and 2B.

FIG. 3 shows a light emission timing in a case that the mechanical front curtain shutter is used in the photographing, and FIG. 4 shows in flowchart the details of the exposure by the mechanical front curtain shutter in the photographing operation shown in FIGS. 2A and 2B.

In FIG. 3, time lapse is taken along the abscissa, a term "light emission" represents a timing of light emission of the light emission unit 118, Mag3-1 represents a control signal for controlling the mechanical front curtain shutter, and Mag3-2 represents a control signal for controlling the mechanical rear curtain shutter.

In this example, the image signal is read from the top to the bottom of the image pickup device 107. A curved line 403 represents a state where the mechanical front curtain shutter moves from the top to the bottom of a surface of the image pickup device 107, and a curved line 402 represents a state where the mechanical rear curtain shutter moves from the top to the bottom of the surface of the image pickup device 107. Symbol VD represents a state change signal for changing the state of the image pickup device 107.

With reference to FIGS. 3 and 4, the details of the exposure performed by the mechanical front curtain shutter in step S111 of FIG. 2 will be described. In a case that the exposure in step S111 is performed from a state where a moving image is displayed, the control unit 115 controls the shutter drive unit 106 so as to charge the mechanical front curtain shutter that has already started to travel, so that the shutter is returned to its initial position, whereby the image pickup device 107 is brought into a light-shielded state (step S202). Next, the control unit 115 controls the shutter drive unit 106 to operate the mechanical front curtain shutter.

More specifically, the control unit 115 changes the mechanical front curtain shutter control signal Mag3-1 from a high level to a low level, thereby causing the mechanical front curtain shutter to start travelling (step S203). As a result, the mechanical front curtain shutter travels along the surface of the image pickup device 107. The shutter 105 gradually opens from the side of the top of the image pickup device 107, so that charges are accumulated in the image pickup device 107. At that time, the image pickup device is in an exposure state.

Next, the control unit 115 determines whether the travel of the mechanical front curtain shutter is completed (step S204). If the answer to step S204 is NO, the control unit 115 waits for the shutter travel being completed.

When the travel of the mechanical front curtain shutter is completed, i.e., when the shutter passes through a position indicated by a circle mark in FIG. 3, the control unit 115 controls the light emission unit controller 119 to cause the light emission unit 118 (e.g., a strobe) to emit light (step S205).

To detect the completion of the shutter travel, a photo reflector or the like is provided whose output signal (second timing signal) changes when the shutter passes through the travel completion position. The control unit 115 monitors the output signal of the reflector to determine whether the travel of the mechanical front curtain shutter is completed.

Next, the control unit 115 determines whether a predetermined exposure time has lapsed (step S206). If the answer to step S206 is NO, the control unit 115 waits for the lapse of the predetermined exposure time.

When the predetermined exposure time has lapsed, the control unit 115 controls the shutter drive unit 106 to cause the mechanical rear curtain shutter to travel, thereby closing the shutter 105.

More specifically, the control unit 115 changes the mechanical rear curtain shutter control signal Mag3-2 from a high level to a low level, whereby the shutter drive unit 106 causes the mechanical rear curtain shutter to travel (step S207). As a result, the mechanical rear curtain shutter closes from the side of the top of the image pickup device 107, and the charge accumulation is completed. Upon completion of the travel of the mechanical rear curtain shutter, the exposure operation is completed.

In the above-described example, the photo reflector (hereinafter, referred to as the PR) is used to detect whether the mechanical front curtain shutter passes through the travel completion position, but this is not limitative. A photo interrupter or a mechanical switch can be used for the detection.

Figure 5A:
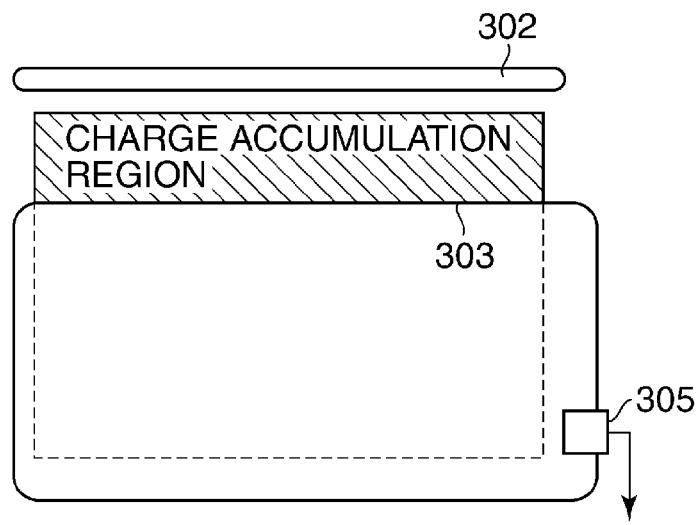
Figure 5B:
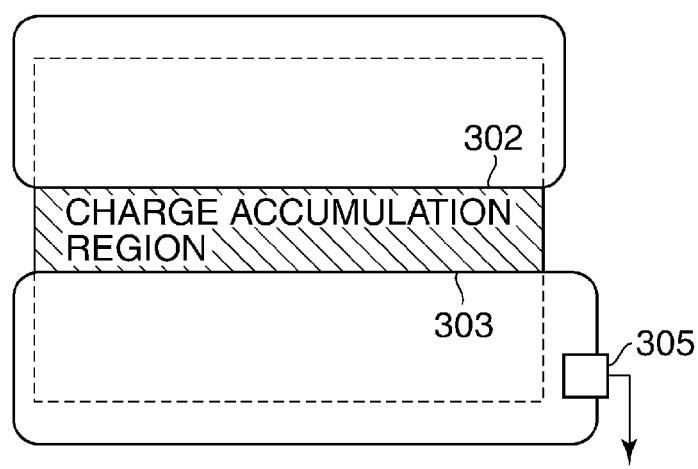
Figure 5C:
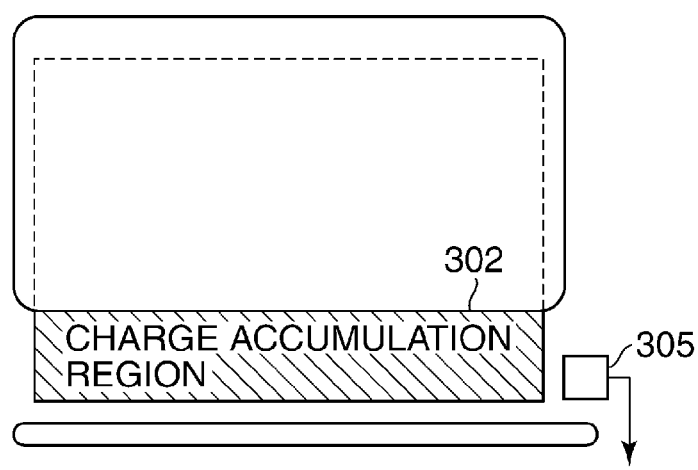

FIGS. 5A to 5C schematically show motions of the mechanical front and rear curtain shutters 303, 302 in a case that the mechanical front curtain shutter 303 is used in the photographing. FIG. 5A shows a state immediately after the travel of the mechanical front curtain shutter 303 is started, FIG. 5B shows a state where both the mechanical front and rear curtain shutters 303, 302 are travelling, and FIG. 5C shows a state where the travel of the mechanical front curtain shutter 303 is completed.

In FIGS. 5A to 5C, the image pickup device 107 and the mechanical front and rear curtain shutters 303, 302 are shown as seen from a front side of the digital camera.

In FIG. 5A, after the travel of the mechanical front curtain shutter 303 is started, electric charges are accumulated on the image pickup surface of the image pickup device 107 on a region-by-region basis from an upper region of the image pickup surface. Since the PR 305 detects the mechanical front curtain shutter 303, it is indicated that the travel of the shutter 303 has not been completed as yet.

In FIG. 5B, both the mechanical front and rear curtain shutters 303, 302 are travelling. In the case of strobe photographing, the travel of the mechanical rear curtain shutter 302 is started after completion of the travel of the mechanical front curtain shutter 303. In the illustrated example, however, a state where both the shutters 303, 302 are traveling is shown on purpose to explain motions of these shutters. Since the mechanical front curtain shutter 303 is detected by the PR 305, it is indicated that the travel of the shutter 303 has not been completed as yet.

In FIG. 5C, when the travel of the mechanical front curtain shutter 303 is completed, the PR 305 does not detect the shutter 303 and outputs an output signal representing that the travel of the mechanical front curtain shutter is completed. As described above, whether the travel of the mechanical front curtain shutter 303 has been completed can be detected by the PR 305.

Figure 6:
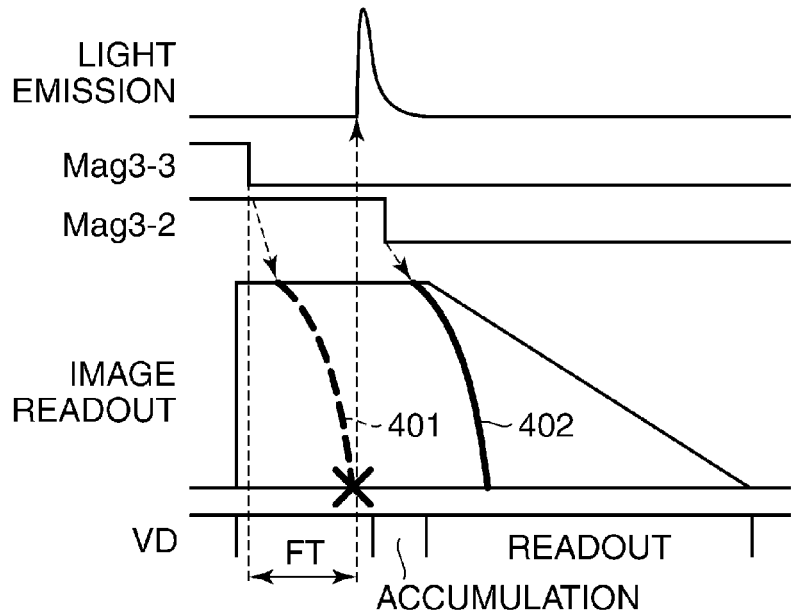
FIG. 6 is a view showing a light emission timing in a case where an electronic front curtain shutter is used in the photographing.
Figure 7:
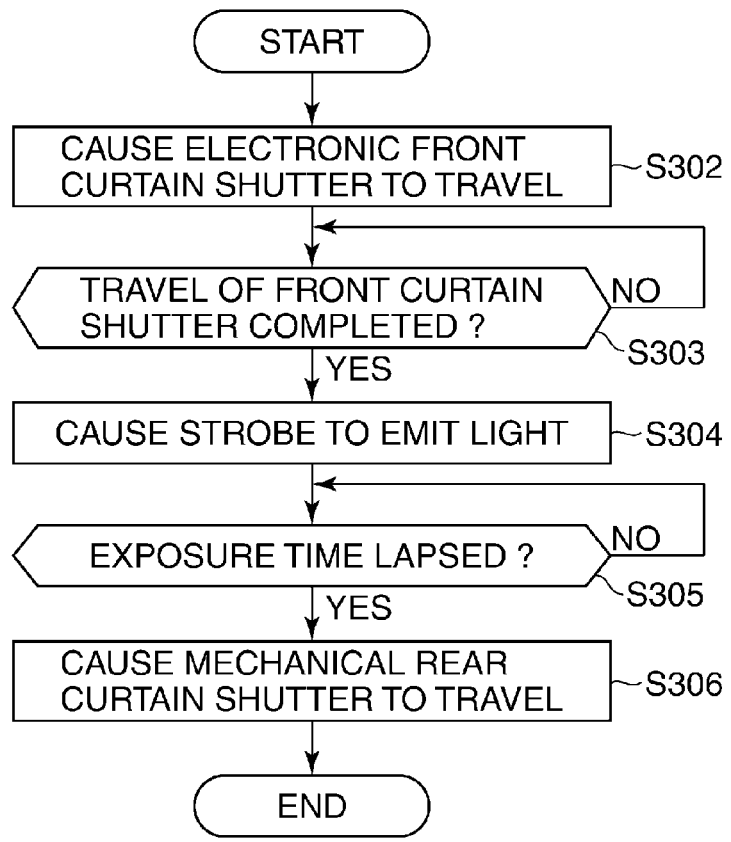
FIG. 7 is a flowchart showing the details of the exposure by the electronic front curtain shutter in the photographing operation shown in FIGS. 2A and 2B.

FIG. 6 shows a light emission timing in a case that an electronic front curtain shutter is used in the photographing, and FIG. 7 shows in flowchart the details of the exposure by the electronic front curtain shutter in the photographing operation shown in FIGS. 2A and 2B;

In FIG. 6, time lapse is taken along the abscissa, a term "light emission" represents a timing of light emission of the light emission unit 118, and Mag3-3 represents a control signal for controlling the electronic front curtain shutter, which is equivalent to the mechanical front curtain shutter control signal Mag3-1 shown in FIG. 3.

In this example, the image signal is read from the top to the bottom of the image pickup device 107. A dotted curved line 401 represents a state where the electronic front curtain shutter 301 moves from the top to the bottom of the surface of the image pickup device 107, and a curved line 402 represents a state where the mechanical rear curtain shutter 302 moves from the top to the bottom of the surface of the image pickup device 107.

With reference to FIGS. 6 and 7, the details of the exposure performed by the electronic front curtain shutter in step S111 of FIG. 2 will be described. When the exposure in step S111 is started, the control unit 115 controls the timing generation unit 109 and the image pickup signal processing circuit 108 to operate the electronic front curtain shutter 301. More specifically, the control unit 115 changes the electronic front curtain shutter control signal Mag3-3 from a high level to a low level, thereby causing the electronic front curtain shutter 301 to start travelling (step S302). As a result, the electronic front curtain shutter 301 travels along the surface of the image pickup device 107. Thus, charges are accumulated in the image pickup device 107 from the top thereof. At that time, the image pickup device 107 is in an exposure state.

Next, the control unit 115 determines whether the travel of the electronic front curtain shutter 301 is completed (step S303). If the answer to step S303 is NO, the control unit 115 waits for the travel of the shutter 301 being completed.

When the electronic front curtain shutter 301 is completed, i.e., when the shutter 301 reaches a position shown by an X mark in FIG. 6, the control unit 115 controls the light emission unit controller 119 to cause the light emission unit 118 (e.g., a strobe) to emit light (step S304). How the completion of the travel of the shutter 301 is detected will be described later. Next, the control unit 115 determines whether a predetermined exposure time has lapsed (step S305). If the answer to step S305 is NO, the control unit 115 waits for the lapse of the predetermined exposure time.

When the predetermined exposure time has lapsed, the control unit 115 controls the shutter drive unit 106 to cause the mechanical rear curtain shutter to travel, thereby closing the shutter 105.

More specifically, the control unit 115 changes the mechanical rear curtain shutter control signal Mag3-2 from a high level to a low level, whereby the shutter drive unit 106 causes the mechanical rear curtain shutter 302 to travel (step S306). As a result, the shutter 302 closes from the side of the top of the image pickup device 107, and the charge accumulation is completed. Upon completion of the travel of the shutter 302, the exposure operation is completed.

Figure 8A:
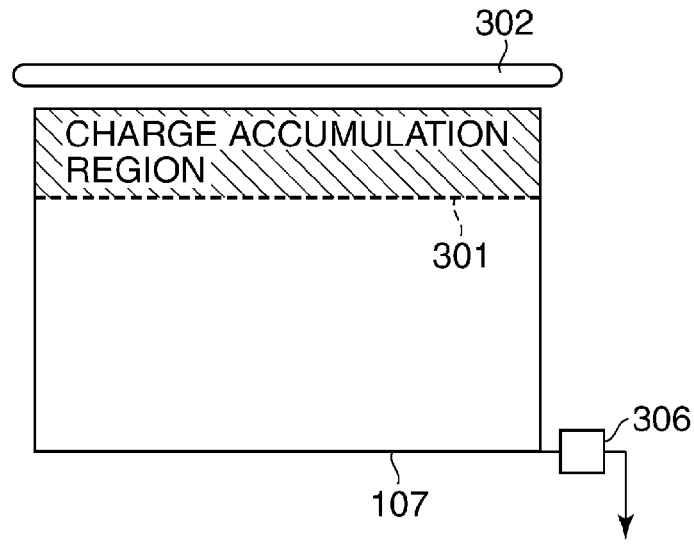
Figure 8B:
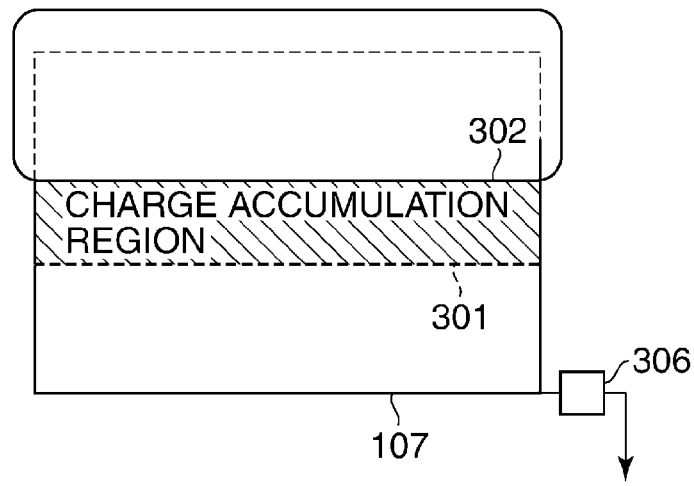
Figure 8C:
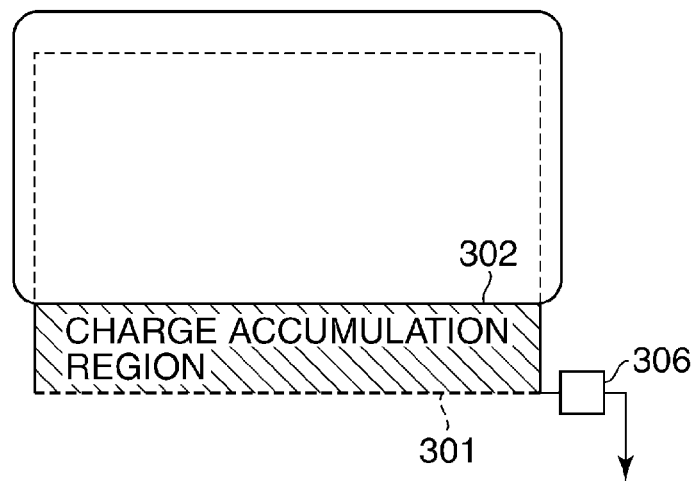

FIGS. 8A to 8C schematically show motions of the electronic front curtain shutter 301 and the mechanical rear curtain shutter 302 in a case that the electronic front curtain shutter 301 is used in the photographing. FIG. 8A shows a state immediately after the travel of the electronic front curtain shutter 301 is started, FIG. 8B shows a state where both the electronic front curtain shutter 301 and the mechanical rear curtain shutter 302 are travelling, and FIG. 8C shows a state where the travel of the electronic front curtain shutter 301 is completed.

In FIGS. 8A to 8C, the image pickup device 107, the electronic front curtain shutter 301, and the mechanical rear curtain shutter 302 are shown as seen from the front side of the digital camera.

In FIG. 8A, when the travel of the electronic front curtain shutter 301 is started, electric charges are accumulated on the image pickup surface of the image pickup device 107 on a region-by-region basis from an upper region of the image pickup surface. Since the electronic front curtain shutter 301 has not reached a position of the detection unit 306 and the detection unit 306 does not detect the shutter 301, it is determined that the shutter 301 is not in a travel completion state. How the position of the shutter 301 is detected will be described later.

In FIG. 8B, both the electronic front curtain shutter 301 and the mechanical rear curtain shutter 302 are travelling from one end (upper end) to another end (lower end) of the image pickup device 107. In the case of strobe photographing, the mechanical rear curtain shutter 302 is started to travel after completion of travel of the electronic front curtain shutter 301. In the illustrated example, however, the shutters 301, 302 are illustrated in a travelling state on purpose to explain motions of these shutters. Since the electronic front curtain shutter 301 has not reached a position of the detection unit 306, it is determined that the shutter 301 is not in a travel completion state.

In FIG. 8C, when the travel of the electronic front curtain shutter 301 is completed, the detection unit 306 detects the shutter 301 and outputs an output signal (first timing signal) representing the completion of travel of the shutter 301.

The presence or absence of the electronic front curtain shutter 301 cannot be detected by the PR 305, unlike the mechanical front curtain shutter 303 (FIG. 7). The following is a description of how the completion of travel of the electronic front curtain shutter 301 is detected by the detection unit 306. First, the construction of the image pickup device 107 and a driving method thereof are described, and then a rolling electronic shutter operation and detection of completion of travel of the electronic front curtain shutter 301 are described.

Figure 9:
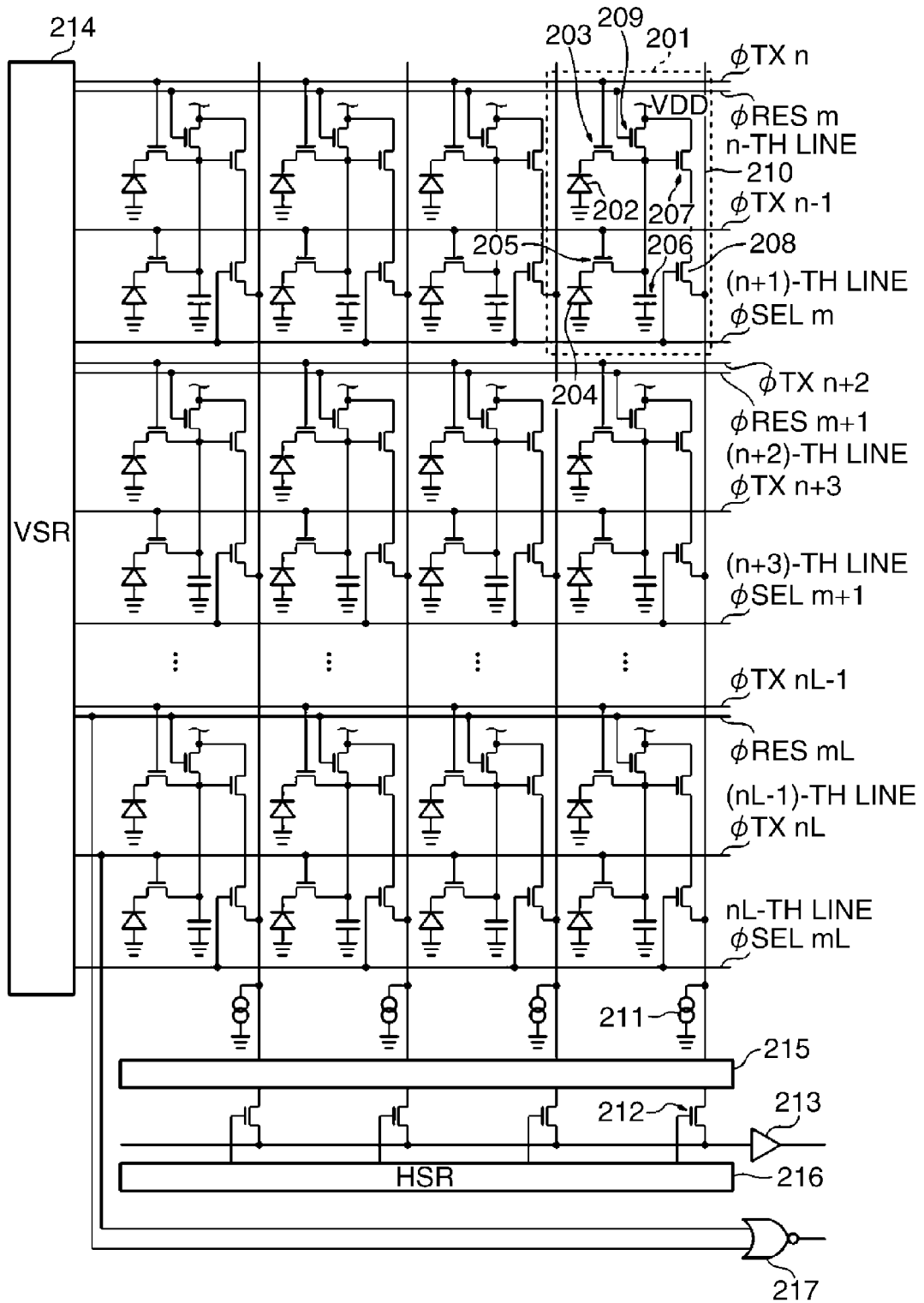
FIG. 9 is a view showing an example construction of the image pickup device shown in FIG. 1.

FIG. 9 shows an example construction of the image pickup device 107.

Referring to FIG. 9, a so-called XY address type scanning technique is applied to the image pickup device 107. The image pickup device 107 includes a plurality of cells (pixels) arranged in matrix wherein one drive unit 201 is constituted by two pixels. In FIG. 9, it is assumed that an n-th line is constituted by a group of pixels which are arranged on a first row and the image pickup device 107 has the n-th line to an nL-th line, wherein each line refers to a horizontal scan line (which will be sometimes simply referred to as the scan line).

Here, focusing attention to the drive unit 201 at the fourth column of the n-th line (which is the uppermost line in FIG. 9), the two pixels of the drive unit 201 have photodiodes (PDs) 202, 204 each configured to receive light and convert the received light into electric charge. In the illustrated example, the PD 202 is a PD for even-numbered line and the PD 204 is a PD for odd-numbered line. Transfer switches 203, 205 are respectively connected to the PDs 202, 204. The transfer switch 203 transfers charges stored in the PD 202 to an FD (floating diffusion) 206 according to a transfer pulse φTXn, and the transfer switch 205 transfers charges stored in the PD 204 to the FD 206 according to a transfer pulse φTXn+1. The charges are temporarily stored in the FD 206. In this example, the transfer switch 203 is a transfer switch for even-numbered line, and the transfer switch 205 is a transfer switch for odd-numbered line.

The drive unit 201 includes a MOS amplifier 207, selection switch 208, and reset switch 209. The MOS amplifier 207 functions as a source follower when a signal (i.e., charge) is read from the FD 206. The selection switch 208 operates according to a selection pulse φSELm. The FD 206 of the drive unit 201 is selected by the selection switch 208. The reset switch 209 removes the charges stored in the FD 206 according to a reset pulse φRESm. A floating diffusion amplifier is constituted by the FD 206, MOS amplifier 207, and constant current source 211.

The signal charge stored in the FD 206, which is selected by the selection switch 208, is converted into a voltage by charge-to-voltage conversion by the MOS amplifier 207 and constant current source 211, and the resultant voltage is output to a reading circuit 215 through a signal output line 210. The constant current source 211 constitutes a load of the MOS amplifier 207. Other drive units operate similarly to the drive unit 201.

Selection switches 212 for respective columns are connected to the reading circuit 215. These selection switches 212 are driven by a horizontal scanning circuit (HSR) 216, and voltage signals (hereinafter, referred to as the pixel signals) for respective columns are selectively output from the reading circuit 215 through the selection switches 212. A pixel signal selected by the horizontal scanning circuit 216 is amplified by and output from the output amplifier 213. The transfer switches 203, 205, selection switch 208, and reset switch 209 are driven by a vertical scanning circuit (VSR) 214. More specifically, the vertical scanning circuit 214 selectively outputs transfer pulses φTXn to φTXnL, selection pulses φSELm to φSELmL, and reset pulses φRESm to φRESmL, thereby driving the transfer switches 203, 205, selection switch 208, and reset switch 209.

In FIG. 9, symbols φTXn and φRESm respectively denote the transfer pulse and reset pulse for the n-th line, and symbols φTXn+1 and φSELm respectively denote the transfer pulse and selection pulse for the (n+1)-th line. A relation of m=n/2 (where n and m each represent an integer equal to or larger than 0) is fulfilled. Symbols φTXnL−1 and φRESmL respectively denote the transfer pulse and reset pulse for the (nL−1)-th line (which is a row that immediately precedes the last row), and symbols φTXnL and φSELmL respectively denote the transfer pulse and selection pulse for the nL-th line (which is the last row).

In the illustrated example, the image pickup device 107 having pixels arranged in 6 row by 4 column matrix is shown for simplicity of illustration, but is not limitative.

Figure 10:
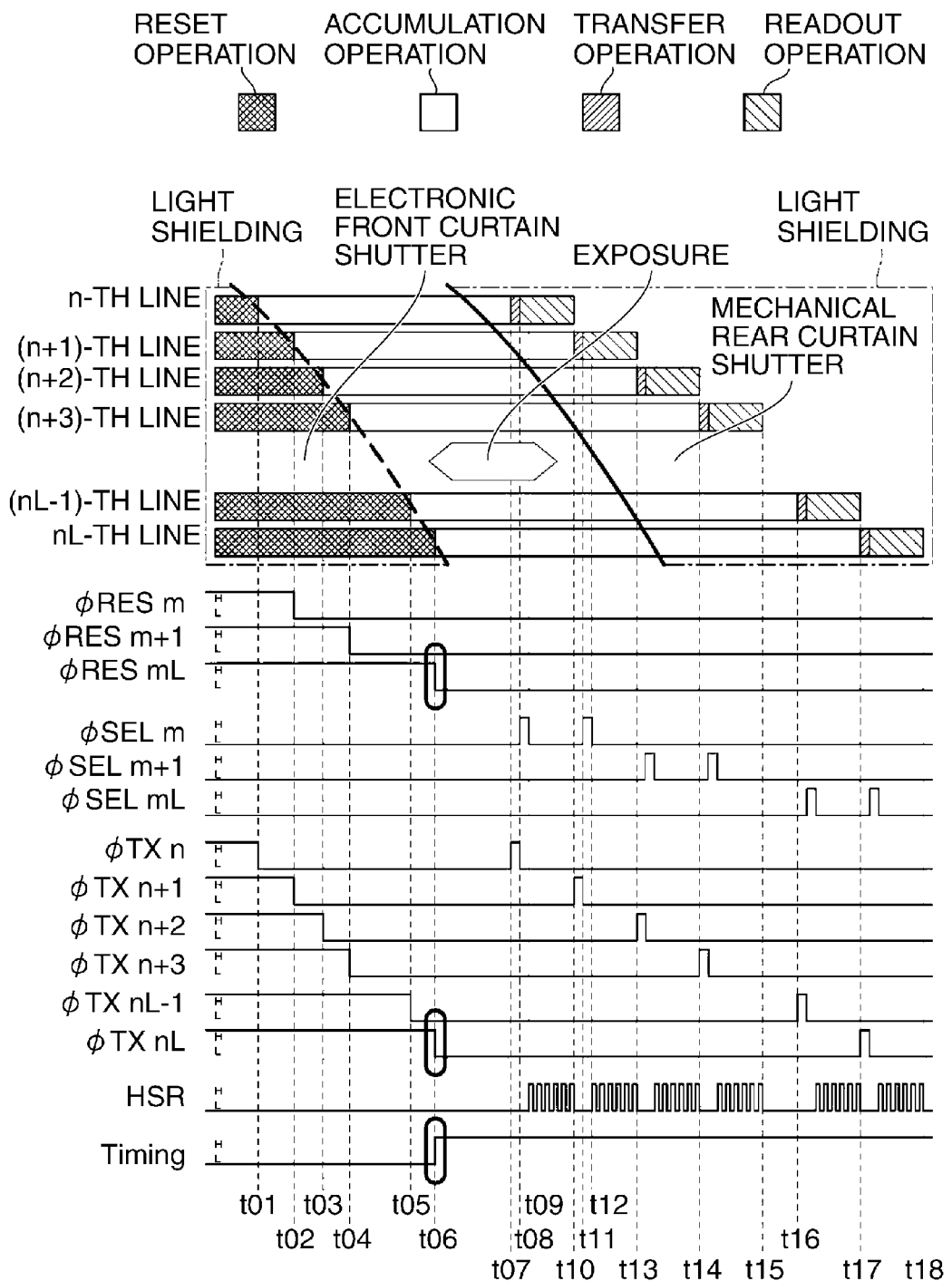
FIG. 10 is a view showing an operation sequence that shows how the electronic front curtain shutter is driven.

FIG. 10 shows an operation sequence that shows how the electronic front curtain shutter is driven. With reference to FIG. 10, a description will be given for the n-th to (n+3)-th lines and the (nL−1)-th to nL-th lines, which are scan-selected by the vertical scanning circuit 214.

To operate the electronic front curtain shutter, the reset pulse φRESm and transfer pulse φTXn for the n-th line are first set to ON (high level (H)) by the vertical scanning circuit 214 during a time period up to time t01, whereby the transfer switches 203, 205 and reset switch 209 are turned on. As a result, a reset operation is performed to remove unnecessary charges stored in the PD 202 of the n-th line, the PD 205 of the (n+1)-th line, and the FD 206.

Next, at time t01, the transfer pulse φTXn is set to OFF (low level (L)) by the vertical scanning circuit 214, whereby the transfer switch 203 is turned off. As a result, an accumulation operation is started to accumulate charges generated in the PD 202. At that time, since the reset pulse φRESm is at a high level, the reset switch 209 is in an ON state.

The reset pulse φRESm and transfer pulse φTXn+1 for the (n+1)-th line are set to high level by the vertical scanning circuit 214 during a time period up to time t02, whereby the transfer switch 205 and reset switch 209 are turned on, so that a reset operation is performed to remove unnecessary charges stored in the PD 204 of the (n+1)-th line and the FD 206.

At time t02, the transfer pulse φTXn+1 is set to low level by the vertical scanning circuit 214, whereby the transfer switch 205 is turned off, so that an accumulation operation is started to store charges generated in the PD 204. At that time, the vertical scanning circuit 214 sets the reset pulse φRESm to low level, thereby turning the reset switch 209 off.

At time t03, the transfer pulse φTXn+2 for the (n+2)-th line is set to low level by the vertical scanning circuit 214, whereby a shift is made from reset state to accumulation state, so that charge accumulation in the PD 202 is started. At time t04, the transfer pulse φTXn+3 and reset pulse φRESm+1 for the (n+3)-th line are set to low level by the vertical scanning circuit 214, whereby a shift is made from reset state to accumulation state, so that charge accumulation in the PD 204 is started.

At time t05, the transfer pulse φTXnL−1 for the (nL−1)-th line is set to low level by the vertical scanning circuit 214, whereby a shift is made from reset state to accumulation state, so that charge accumulation in the PD 202 is started. At time t06, the transfer pulse φTXnL and reset pulse φRESmL for the nL-th line are set to low level by the vertical scanning circuit 214 to make a shift from reset state to accumulation state, so that charge accumulation in the PD 204 is started.

The vertical scanning circuit 214 repeats the above-described operation, thereby making a shift from reset state to accumulation state for all the rows (i.e., from the n-th line to the nL-th line) of the image pickup device 107 in sequence. By doing this, the vertical scanning circuit 214 controls timings where the transfer pulses φTX (suffixes are omitted) are changed from high level to low level in such a manner that an operation state of the electronic front curtain (shown by a dotted curved line in FIG. 10) becomes similar to that of the mechanical rear curtain (shown by a solid curved line). According to the time t06 where the charge accumulation in the nL-th line of the image pickup device 107 is started, i.e., according to the timing where the travel of the electronic front curtain shutter is completed, the overall control and calculation unit 115 controls the light emission unit controller 119 to cause the light emission unit 118 to emit light.

More specifically, the detection unit 306 detects, based on an output from a NOR gate 217, a timing where both the transfer pulse φTXnL and reset pulse φRESmL are changed to low level, and supplies a resultant timing signal to the overall control and calculation unit 115. The timing signal is made equivalent to an output signal of the PR 305 shown in FIG. 5.

Next, the transfer pulse φTXn is set to high level during a time period from t07 to t08 by the vertical scanning circuit 214, whereby the transfer switch 203 is turned on, so that charges stored in the PD 202 are transferred to the FD 206. After completion of charge transfer in the n-th line, the selection pulse φSELm is set to high level during a time period from t08 to t09 by the vertical scanning circuit 214, so that the selection switch 208 is turned on. As a result, charges stored in the FD 206 are converted into a voltage by the vertical scanning circuit 214 from which a voltage signal is output to the reading circuit 215.

The horizontal scanning circuit 216 performs on/off control of the selection switch 212 during a time period from t09 to time t10 to output voltage signals for one horizontal line. These voltage signals are sequentially output as image signals by the output amplifier 213.

During a time period from t10 to t11, the transfer pulse φTXn+1 for the (n+1)-th line is set to high level by the vertical scanning circuit 214, whereby the transfer switch 205 is turned on, so that charges stored in the PD 204 are transferred to the FD 206. After completion of charge transfer in the (n+1)-th line, the selection pulse φSELm is again set to high level during a time period from t11 to t12 by the vertical scanning circuit 214, whereby charges stored in the FD 206 are converted into a voltage, and a voltage signal is output to the reading circuit 215. During a time period from t12 to t13, the horizontal scanning circuit 216 performs on/off control of the selection switch 212 to output voltage signals for one horizontal line. These voltage signals are sequentially output as image signals from the output amplifier 213.

Subsequently, the above-described operation is repeated. During a time period from t13 to t14, image signals for one horizontal line are read in the (n+2)-th line. Similarly, during a time period from t14 to t15, image signals for one horizontal line are read in the (n+3)-th line. Finally, during a time period from t17 to t18, image signals for one horizontal line are read in the nL-th line, whereupon the photographing operation using the electronic front curtain shutter is completed. Prior to the image signals being read, the mechanical rear curtain shutter is driven in the same direction as that of the electronic front curtain shutter as described above, so that light-shielding is performed sequentially from the first horizontal scan line.

In the above example, the strobe light emission timing signal is output at the reset cancellation timing for the last row of the image pickup device 107. However, it is not limitative to output the timing signal at the reset cancellation timing for the last row. For example, the timing signal for strobe light emission can be output at a reset cancellation timing for a predetermined image pickup region, so that strobe light is emitted earlier by a predetermined time period than the completion of travel of the electronic front curtain shutter. In that case, the predetermined time period (from the reset cancellation for the predetermined region to the reset cancellation for the last row) can be stored in advance in the memory unit 116 or the like, and strobe light can be emitted after lapse of the stored predetermined time period from when the reset cancellation for the predetermined region was performed.

Alternatively, the timing signal for strobe light emission can be output after lapse of a predetermined time period from when the reset cancellation timing for the last row was reached, so that strobe light emission lags behind the completion of travel of the electronic front curtain shutter by the predetermined time period.

Figure 11:
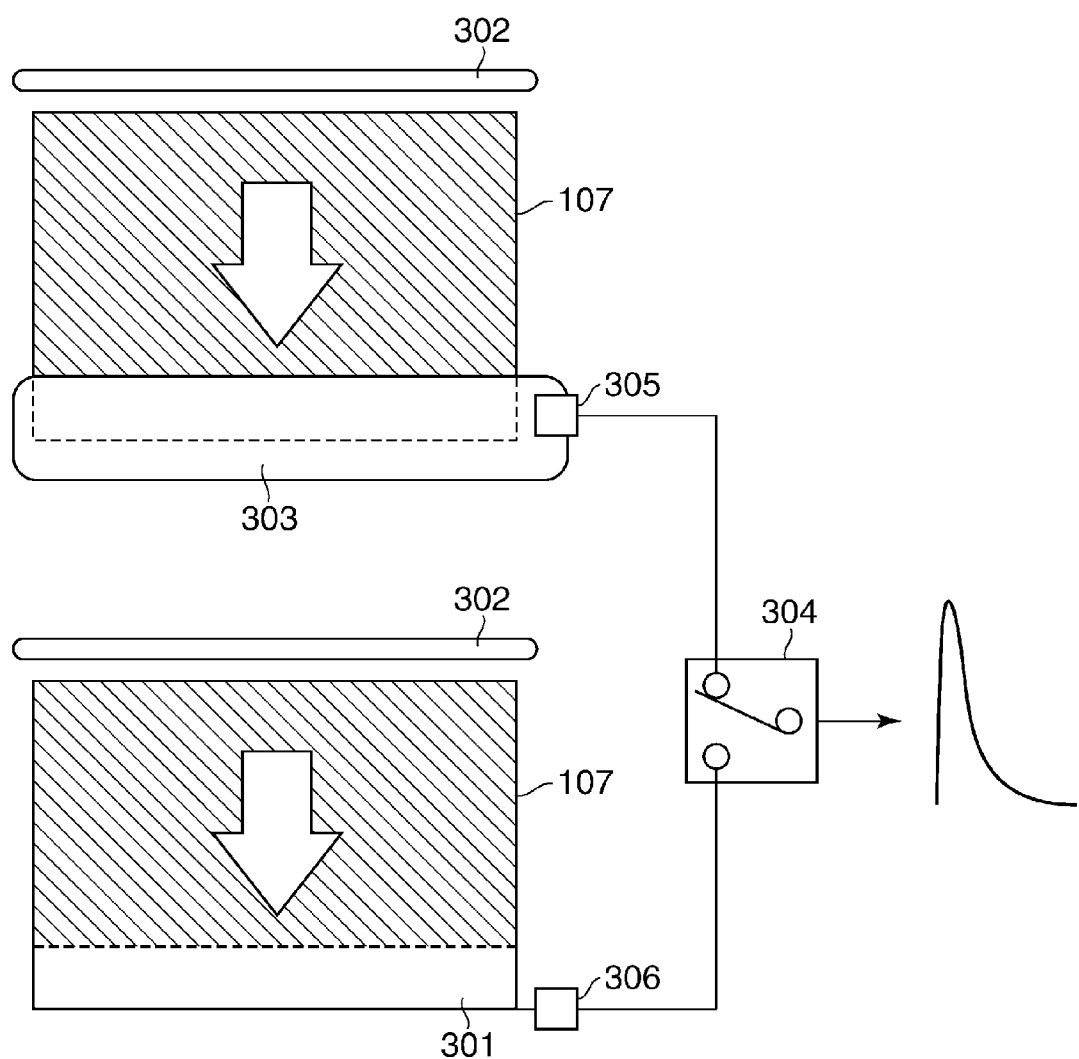
FIG. 11 is a view showing an example construction of the digital camera in which photographing is performed by selectively using either the mechanical front curtain shutter or the electronic front curtain shutter.

FIG. 11 shows an example construction of the digital camera in which photographing is performed by selectively using either the mechanical front curtain shutter or the electronic front curtain shutter.

As shown in FIG. 11, the PR 305 and the detection unit 306 are connected to a selector switch 304, so that either the PR 305 or the detection unit 306 is selected by the selector switch 304. The selector switch 304 is controlled to be switched by, e.g., the overall control and calculation unit 115, whereby either the mechanical front curtain shutter or the electronic front curtain shutter can be selectively used in the photographing.

Since the electronic front curtain shutter is electronically controlled, the identical travel curve of the electronic front curtain shutter can be reproduced again and again. In this example, a travel time period FT of the electronic front curtain shutter (i.e., a time period required for the electronic front curtain shutter to complete its travel from a state where the electronic front curtain control signal Mag3-1 is turned off) is calculated in advance. Upon lapse of the travel time period FT from when the electronic front curtain shutter started to travel, i.e., from when the control signal Mag3-1 changed from high level to low level, the overall control and calculation unit 115 controls the light emission unit controller 119 to cause the light emission unit 118 to emit light, thereby controlling strobe light emission according to the travel of the electronic front curtain shutter.

The travel time period FT of the electronic front curtain shutter varies depending on characteristics of the lens unit. This is because the electronic shutter operates in the image pickup plane and the mechanical shutter is disposed away from the image pickup plane in the shutter mechanism in which the mechanical shutter and electronic shutter are used in combination. Thus, a position where the image pickup plane is light-shielded by the mechanical shutter changes depending on, e.g., the focal length and exit pupil distance of the lens unit (photographing lens). In particular, at a high shutter speed (i.e., when a time period from execution of the reset scanning to the light-shielding by the mechanical shutter is short), exposure nonuniformity occurs in the shutter traveling direction. To reduce the exposure nonuniformity, it is preferable to set a scan pattern in such a manner that a time period from when charge accumulation is started to when the mechanical shutter travels on each of regions of the image pickup device is made different between respective regions. In other words, it is preferable that the travel time period FT be corrected according to, e.g., the type, zoom position, and focus position of the photographing lens, and the diaphragm value.

According to the above-described embodiment, the timing signal for light emission can be output in a proper timing even when the electronic front curtain shutter is used. It is therefore possible to cause the light emission unit to emit light in a proper timing, even when strobe photographing is performed by using the electronic front curtain shutter.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2010-121688, filed May 27, 2010, which is hereby incorporated by reference herein in its entirety.

What is claimed is:

1. An image pickup apparatus capable of performing still image photographing with light emission of a light emission unit, comprising:
   an image pickup device configured to store charges generated according to a received amount of light;
   a scanning unit configured to perform scanning for sequentially starting charge accumulation in respective image pickup regions of said image pickup device from one end to another end of said image pickup device;
   a detection unit configured to detect that the scanning for a predetermined image pickup region of said image pickup device has been performed by said scanning unit after the scanning by the scanning unit is started; and
   a light emission control unit configured, in a case where still image photographing with light emission of the light emission unit is performed, to cause the light emission unit to start light emission in response to the fact that said detection unit detects that the scanning for the predetermined image pickup region has been performed.

2. The image pickup apparatus according to claim 1, wherein the predetermined image pickup region is a last image pickup region where the scanning is performed last among the image pickup regions of said image pickup device.

3. The image pickup apparatus according to claim 1, wherein said light emission control unit causes said light emission unit to emit light after lapse of a predetermined time period from when said detection unit detected that the scanning for the predetermined image pickup region was performed.

4. The image pickup apparatus according to claim 3, further including:
   a correction unit configured to correct, according to a photographing condition, a time period from when said detection unit detects that the scanning for the predetermined image pickup region has been performed to when said light emission control unit causes said light emission unit to emit light.

5. The image pickup apparatus according to claim 4, wherein the photographing condition includes at least one of a type, zoom position, and focus position of a photographing lens, and a diaphragm value.

6. The image pickup apparatus according to claim 4, wherein the photographing condition includes at least one of a focal length and exit pupil distance of a photographing lens.

7. The image pickup apparatus according to claim 1, including:
   a storage unit configured to store a time period from when the scanning for the predetermined image pickup region is performed to when the scanning for the last image pickup region is performed by said scanning unit,
   wherein said light emission control unit causes said light emission unit to emit light after lapse of the time period stored in said storage unit from when said detection unit detected that the scanning for the predetermined image pickup region was performed.

8. The image pickup apparatus according to claim 7, further including:
   a correction unit configured to correct the time period stored in said storage unit according to a photographing condition.

9. The image pickup apparatus according to claim 8, wherein the photographing condition includes at least one of a type, zoom position, and focus position of a photographing lens, and a diaphragm value.

10. The image pickup apparatus according to claim 8, wherein the photographing condition includes at least one of a focal length and exit pupil distance of a photographing lens.

11. The image pickup apparatus according to claim 1, wherein the predetermined image pickup region corresponds to a predetermined position of a shutter relative to the image pickup device.

12. The image pickup apparatus according to claim 1, wherein the detection unit is configured to detect finish of resetting before starting charge accumulation by the scanning unit for the predetermined image pickup region and the light emission control unit is configured, in a case where still image photographing with light emission of the light emission unit is performed, to cause the light emission unit to start light emission in response to the fact that said detection unit detects that the finish of resetting by the scanning unit for the predetermined image pickup region has been performed.

13. The image pickup apparatus according to claim 1, wherein intervals of start timing of the charge accumulation are not constant.

14. The image pickup apparatus according to claim 13, wherein the scanning unit changes the intervals based on the photographing condition.

15. The image pickup apparatus according to claim 13, wherein the photographing condition includes at least one of a type, zoom position, and focus position of a photographing lens, and a diaphragm value.

16. The image pickup apparatus according to claim 13, wherein the photographing condition includes at least one of a focal length and exit pupil distance of a photographing lens.

17. The image pickup apparatus according to claim 1, wherein a time difference between a timing that the scanning for a first image pickup region is performed and a timing that the scanning for the last image pickup region is performed is variable.

18. The image pickup apparatus according to claim 17, wherein the scanning unit changes the time difference based on the photographing condition.

19. The image pickup apparatus according to claim 17, wherein the photographing condition includes at least one of a type, zoom position, and focus position of a photographing lens, and a diaphragm value.

20. The image pickup apparatus according to claim 17, wherein the photographing condition includes at least one of a focal length and exit pupil distance of a photographing lens.

21. A control method for an image pickup apparatus having an image pickup device for storing charges generated according to a received amount of light and capable of performing still image photographing with light emission of a light emission unit, comprising:
a scanning step of performing scanning for sequentially starting charge accumulation in respective image pickup regions of the image pickup device from one end to another end of the image pickup device;
a detection step of detecting that the scanning for a predetermined image pickup region of the image pickup device has been performed in said scanning step after the scanning in the scanning step is started; and
a light emission control step of causing the light emission unit to start light emission in response to the fact that it is detected in said detection step that the scanning for the predetermined image pickup region has been performed in a case where still image photographing with light emission of the light emission unit is performed.

22. An image pickup apparatus capable of performing still image photographing with light emission of a light emission unit, comprising:
an image pickup device configured to store charges generated according to a received amount of light;
a scanning unit configured to perform scanning for sequentially starting charge accumulation in respective image pickup regions of said image pickup device from one end to another end of said image pickup device;
a detection unit configured to detect that the scanning for a predetermined image pickup region of said image pickup device has been performed by said scanning unit; and
a light emission control unit configured, in a case where still image photographing with light emission of the light emission unit is performed, to cause the light emission unit to start light emission in response to the fact that said detection unit detects that the scanning for the predetermined image pickup region has been performed.

23. The image pickup apparatus according to claim 22, wherein the intervals of start timing of charge accumulation are not constant.

24. The image pickup apparatus according to claim 22, the scanning unit changes the intervals based on the photographing condition.

25. The image pickup apparatus according to claim 22, wherein the photographing condition includes at least one of a type, zoom position, and focus position of a photographing lens, and a diaphragm value.

26. The image pickup apparatus according to claim 22, wherein a time difference between a timing that the scanning for a first image pickup region is performed and a timing that the scanning for the last image pickup region is performed is variable.

27. The image pickup apparatus according to claim 26, wherein the scanning unit changes the time difference based on the photographing condition.

28. The image pickup apparatus according to claim 26, wherein the photographing condition includes at least one of a type, zoom position, and focus position of a photographing lens, and a diaphragm value.

29. The image pickup apparatus according to claim 26, wherein the photographing condition includes at least one of a focal length and exit pupil distance of a photographing lens.

30. A control method for an image pickup apparatus having an image pickup device for storing charges generated according to a received amount of light and capable of performing still image photographing with light emission of a light emission unit, comprising:
a scanning step of performing scanning for sequentially starting charge accumulation in respective image pickup regions of the image pickup device from one end to another end of the image pickup device;
a detection step of detecting that the scanning for a predetermined image pickup region of the image pickup device has been performed in said scanning step; and
a light emission control step of causing the light emission unit to start light emission in response to the fact that it is detected in said detection step that the scanning for the predetermined image pickup region has been performed in a case where still image photographing with light emission of the light emission unit is performed.

31. A control method in accordance with claim 30, wherein a time difference between a timing that the scanning in the scanning step is performed for a first image pickup region and a timing that the scanning in the scanning step is performed for the last image pickup region is variable.

* * * * *